Jan. 18, 1966    L. E. MILLS ETAL    3,230,151
FUEL ELEMENT FOR A NUCLEAR REACTOR
Filed April 20, 1964
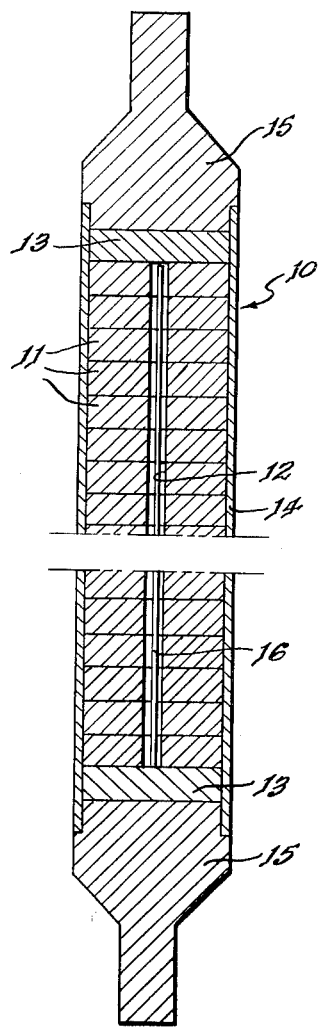
INVENTORS.
LORING E. MILLS
JOSEPH J. HAUTH
CLARENCE H. BLOOMSTER
DAVID F. CARROLL
BY
ATTORNEY

United States Patent Office 3,230,151
Patented Jan. 18, 1966

3,230,151
FUEL ELEMENT FOR A NUCLEAR REACTOR
Loring E. Mills, Normal, Ill., and Joseph J. Hauth, Clarence H. Bloomster, and David F. Carroll, Richland, Wash., assignors to the United States of America as represented by the United States Atomic Energy Commission
Filed Apr. 20, 1964, Ser. No. 361,630
2 Claims. (Cl. 176—73)

The invention described herein was made in the course of, or under, a contract with the U.S. Atomic Energy Commission.

This invention relates to a fuel element for a nuclear reactor, to a method of preparing a fuel element for a nuclear reactor, and to a method of rejuvenating a fuel element for a nuclear reactor. In more detail, the invention relates to a fuel element containing a fissionable isotope concentrated along the axis of the fuel element, to a method of preparing said fuel element, and to a method of rejuvenating said fuel element.

The invention will be described hereinafter specifically with respect to fuel elements in which the fissionable istope is plutonium–239 since it is most advantageously applied to such fuel elements. It will be appreciated, however, that the invention also applies to fuel elements containing other fissionable isotopes such as uranium–233 and uranium–235.

A review article on pages 37–52 of the January 1963 issue of "Nucleonics" magazine describes the large amount of work that is now going into the development of plutonium as a fuel in view of the importance of fully utilizing our nuclear fuel reserves but indicates that this developmental work has not yet reached the stage where plutonium is practical for commercial power reactors.

One of the primary goals of the atomic energy industry therefore is to develop simple, inexpensively fabricated, plutonium-bearing, metallic and ceramic fuel elements are safe operation at high specific power levels and for long periods of time, since fuel elements having these attributes are essential before plutonium-fueled power reactors can be practical.

Plutonium-bearing fuels may be homogeneous or heterogeneous. While homogeneous fuels have been prepared and used in the past, it is believed that heterogeneous fuels bear the most promise for the future, since the plutonium need not be added until after much of the required processing has been accomplished, thus reducing shielding requirements and handling difficulties. However, problems arise in controlling the distribution of the plutonium within the matrix fuel during the last stages of fabrication. Furthermore, it has been shown that the value of plutonium in a heterogeneously enriched fuel element in which the plutonium is concentrated in a slender rod along the axis of the fuel elements is greater than the value of plutonium in a homogeneously enriched fuel element in which the plutonium is uniformly distributed throughout the fuel.

It is accordingly an object of the present invention to develop a novel heterogeneously enriched fuel element for a nuclear reactor.

It is a more detailed object of the present invention to develop a plutonium-bearing fuel element in which the plutonium is concentrated along the axis of the fuel element.

It is a further object of the present invention to develop a simple, inexpensive and safe method of preparing a fuel element for a nuclear reactor wherein plutonium is added just before making the final end closure.

It is another object of the present invention to develop a simple and inexpensive method of rejuvenating a fuel element for a nuclear reactor without reprocessing the fuel contained in the fuel element.

These and other objects of the present invention are attained by positioning a metallic plutonium-containing wire along the axis of a uranium dioxide fuel element. To prepare a fuel element according to the present invention a plutonium-containing wire is introduced into an axial void in a ceramic fuel which is enclosed in a tube, the wire being substantially smaller than the void. To rejuvenate an element a plutonium-containing wire is introduced into the axial void formed in the fuel element during irradiation. The fuel element being rejuvenated may be either a conventional ceramic element containing no wire or may have originally contained a plutonium-containing wire. The plutonium-zirconium wire may be either bare or clad in a suitable protective material. A bare wire is, of course, advantageous because its use does not introduce neutron-absorbing material into the fuel element. However, it is also possible to employ clad plutonium-zirconium wire which makes it possible to prepare a plutonium-containing fuel element using the same technique, equipment and facilities as those employed for natural uranium dioxide fuel elements. Using prefabricated, clad plutonium alloy wire, all remaining fabrication operations can be carried out to produce a plutonium-containing fuel element without any of the precautions now required. This means that present commercial facilities for producing either pelleted or particulate fuel can be converted with very little modification to plutonium fuel production.

Both the bare wire and the clad wire oxidize in situ almost instantly by reacting with the uranium dioxide matrix material when the fuel element is raised to operating temperature. The cladding must be a material which is more reactive than plutonium with uranium oxide, or it must have a lower coefficient of expansion than plutonium so that it will burst on heating, or it must have a lower melting point than plutonium so that it melts first. Since both zirconium and aluminum fulfill all these requirements, a plutonium-zirconium wire coated with one of these materails will also oxidize in situ as does a bare plutonium-zirconium wire. In both cases the reaction products fill the void in the ceramic fuel and there is no danger that the wire could melt and slump to the bottom of the void.

Specifically, according to the one embodiment of the invention, a plurality of sintered natural uranium dioxide fuel pellets having an axial void therein are provided, these pellets are enclosed in a Zircaloy–2 tube which is closed at one end with an end cap, a bare wire of plutonium, 15% zirconium alloy is inserted into the void, and the open end of the tube is closed by welding an end cap therein. The wire may be attached to one end cap to prevent its dislocation during fabrication. Also, according to the present invention, a new plutonium-containing wire may be inserted in the void that forms at the center of the fuel element during operation to rejuvenate the fuel element.

The invention will next be described in connection with the accompanying drawing wherein the single figure is a perspective view, partially broken away, of a fuel element constructed in accordance with the present invention.

In the drawing fuel element 10 includes a plurality of sintered natural uranium dioxide pellets 11 having an axial void 12 drilled therethrough and a solid natural uranium dioxide spacer pellet 13 at each end thereof. A Zircaloy–2 tube 14 provided with end caps 15 encloses fuel pellets 11 and 13. Disposed within axial void 12 is a wire 16 formed of a plutonium-containing material. According to the preferred form of the invention wire 16 is bare but it may also be clad in any suitable corrosion-resistant material. Void 12 is larger than wire 16 to provide room for expansion of the plutonium.

The void must provide sufficient clearance to accommodate the increased volume of the plutonium-zirconium alloy after it oxidizes. The theoretical density of the reaction products is 0.65 times the theoretical density of the plutonium-zirconium wire. Theoretically therefore the volume of the reaction products would be 1.55 times the original volume. However, the density of the reaction products is only about 60 to 70% of theoretical so the void must be large enough to accommodate this expansion and yet of sufficiently small diameter to prevent slumping of reaction products toward the bottom. The volume of the void space should thus be about two and one-half times the volume of the plutonium-zirconium wire, or, more exactly, from about 220 to about 257 percent of the volume of the wire.

A fuel element having the following composition and dimensions was constructed.

*Fabrication data*

Cladding (Zircaloy–2):
O.D., inches _____ 0.565
I.D., inches _____ 0.505

Fuel:
UO$_2$—
Length, inches _____ 9⅝
O.D., inches _____ 0.500
I.D., inches _____ 0.063
Weight, g./in _____ 32.8
Weight U$^{235}$, g./in _____ 0.205
Density (93% TD), g./cc _____ 10.2

Pu-Zr—
Length, inches _____ 9⅛
Diameter, inches _____ 0.040
Weight Pu, g./in _____ 0.290
Density, g./cc _____ 16.5
Composition _____ 85% Pu, 15% Zr This fuel element was irradiated in the Materials Testing Reactor at the National Reactor Test Station at Arco, Idaho, for three weeks. The exposure of the element was 2×10$^{19}$ fissions per cc. The surface heat generation was 122 watts per square centimeter. Examination of this element indicates that plutonium-zirconium wire oxidizes very rapidly at reactor operating temperature and expands, filling the void before the wire can melt.

This fuel element can be rejuvenated if an axial void forms in the element during irradiation. An axial void will form in an element which originally does not contain an axial plutonium-containing wire as well as in one which did originally contain an axial plutonium-containing wire provided the density of the ceramic fuel is not too high and provided the temperature reached at the center of the element is high enough. An element containing uranium dioxide compacted to a density of not greater than 90% of theoretical will contain an axial void when irradiated under typical power conditions, under which conditions high temperatures are attained in the center of the element. Experiments have shown, for example, that test elements irradiated in the Experimental Test Reactor at the National Reactor Test Station in Arco, Idaho, do have a central void therein.

The following explanation of the presence of the void is believed correct.

During irradiation the high temperature along the axis of the element causes the ceramic material there present to undergo extensive changes. Oriented crystal growth takes place concurrently with sintering, and these together lead to an increase in density and a concurrent shrinkage in volume of the material. A central void results along the axis of the fuel element. This void is filled with another plutonium-zirconium wire to rejuvenate the element so that it can be used for a second irradiation cycle without reprocessing of the fuel material.

In order to ensure the presence of an axial void in a fuel element, a hole can be drilled through the element prior to irradiation. This hole can be lined with a zirconium or tungsten tube or the element can be used without the lining. In either case a central axial void will be present following irradiation of the element. This procedure, of course, only applies to an element which does not initially contain an axial plutonium-containing wire.

The following experiments also show that plutonium-zirconium wire oxides very rapidly in contact with uranium dioxide at reactor operating temperatures.

(A) A wafer of Pu-Zr alloy, 0.25×0.25×0.025 inch, was pressed in a UO$_2$ pellet, which was heated for 12 hours in helium at 1700° C. The Pu-Zr alloy wafer was completely oxidized but no detachable reaction of UO$_2$ with any of the alloy constituents occured.

(B) A similar wafer, heated in air, was completely oxidized at 400° C.

(C) A 0.025 inch diameter Pu-Zr wire, axially positioned in the center of a UO$_2$ pellet, was heated for 12 hours at 1700° C. in helium, was also completely oxidized.

These experiments indicate that rapid oxidation of the alloy eliminates any potential danger of hot spots and burnout of the tubing which might have resulted from melting of the hot wire.

The uranium dioxide matrix may be formed by any convenient method such as vibration compaction or swaging. The plutonium-zirconium wire may also be formed by conventional techniques such as extrusion or drawing.

It will be understood that the invention is not to be limited to the details given herein but that it may be modified within the scope of the appended claims.

The embodiments of the invention in which an exclusive property or privilege is claimed are defined as follows:

1. A fuel element for a nuclear reactor comprising a ceramic fuel containing a relatively low amount of a material fissionable by neutrons of thermal energy having an axial void therein, a tube of a corrosion-resistant material surrounding said ceramic fuel, and a slender wire of a metallic fuel containing a relatively high amount of a material fissionable by neutrons of thermal energy disposed in said axial void, said axial void being substantially larger than said wire.

2. A fuel element according to claim 1 wherein said ceramic fuel is sintered pellets of natural uranium dioxide, said wire is composed solely of a plutonium-zirconium alloy, and the volume of said axial void is about two and one-half times the volume of the plutonium wire.

References Cited by the Examiner

UNITED STATES PATENTS 2,879,216   3/1959   Hurwitz et al. _____ 176—90
3,043,761   7/1962   Reynolds _____ 176—90

LEON D. ROSDOL, *Primary Examiner.*

L. DEWAYNE RUTLEDGE, *Examiner.*